(12) United States Patent
Yuan et al.

(10) Patent No.: US 12,124,950 B2
(45) Date of Patent: Oct. 22, 2024

(54) METHOD AND APPARATUS FOR OPTIMIZING QUANTIZATION MODEL, ELECTRONIC DEVICE, AND COMPUTER STORAGE MEDIUM

(71) Applicant: Tencent Technology (Shenzhen) Company Limited, Shenzhen (CN)

(72) Inventors: Yi Yuan, Shenzhen (CN); Zhicheng Mao, Shenzhen (CN); Yongzhuang Wang, Shenzhen (CN); Yuhui Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 492 days.

(21) Appl. No.: 17/401,154

(22) Filed: Aug. 12, 2021

(65) Prior Publication Data

US 2021/0374540 A1 Dec. 2, 2021

Related U.S. Application Data

(63) Continuation of application No. PCT/CN2020/089543, filed on May 11, 2020.

(30) Foreign Application Priority Data

May 10, 2019 (CN) .......................... 201910390616.7

(51) Int. Cl.
*G06N 3/08* (2023.01)
*G06N 10/00* (2022.01)
*G06V 40/20* (2022.01)
(52) U.S. Cl.
CPC ............... *G06N 3/08* (2013.01); *G06N 10/00* (2019.01); *G06V 40/20* (2022.01)

(58) Field of Classification Search
CPC ........... G06N 3/08; G06N 10/00; G06N 3/04; G06N 3/045; G06V 40/20; G06F 16/906; G06F 16/9535
See application file for complete search history.

(56) References Cited

U.S. PATENT DOCUMENTS

2006/0023933 A1\* 2/2006 Mitsui .................... G06V 10/46
382/145
2006/0239338 A1 10/2006 Kolanek et al.
(Continued)

FOREIGN PATENT DOCUMENTS

| CN | 102324034 A | 1/2012 |
|---|---|---|
| CN | 103081366 A | 5/2013 |

(Continued)

OTHER PUBLICATIONS

Jung et al. ("Learning to Quantize Deep Networks by Optimizing Quantization Intervals with Task Loss", arXiv, Nov. 23, 2018) (Year: 2018).*

(Continued)

*Primary Examiner* — Michael J Huntley
*Assistant Examiner* — Imad Kassim
(74) *Attorney, Agent, or Firm* — Morgan, Lewis & Bockius LLP

(57) ABSTRACT

An optimization method comprises determining jump ratios of embedding layer parameters of a trained quantization model in a predetermined time range. The quantization model comprises a neural network model obtained after quantization processing on the embedding layer parameters. The method also comprises determining a jump curve in the predetermined time range according to the jump ratios, and fitting the jump curve to obtain a corresponding time scaling parameter. The method also comprises optimizing an initial algorithm of the quantization model based on the time scaling parameter to obtain an optimized target optimization (Continued)

algorithm, and training the quantization model based on the target optimization algorithm.

19 Claims, 7 Drawing Sheets

(56) References Cited

U.S. PATENT DOCUMENTS

| | | | | |
|---|---|---|---|---|
| 2013/0198729 | A1* | 8/2013 | Turner | G06F 8/443 |
| | | | | 717/151 |
| 2017/0308789 | A1* | 10/2017 | Langford | G06N 3/045 |
| 2020/0065629 | A1* | 2/2020 | Kennedy | G06F 18/22 |
| 2020/0202218 | A1* | 6/2020 | Csefalvay | G06N 3/08 |

FOREIGN PATENT DOCUMENTS

| | | |
|---|---|---|
| CN | 103605909 A | 2/2014 |
| CN | 104978612 A | 10/2015 |
| CN | 105786830 A | 7/2016 |
| CN | 107967489 A | 4/2018 |
| CN | 108562835 A | 9/2018 |
| CN | 109299253 A | 2/2019 |
| CN | 109582875 A * | 4/2019 |
| CN | 109670277 A | 4/2019 |
| CN | 109726524 A | 5/2019 |
| CN | 110069715 A | 7/2019 |
| CN | 110096647 A | 8/2019 |
| WO | WO 2009005734 A2 | 1/2009 |
| WO | WO 2018201151 A1 | 11/2018 |

OTHER PUBLICATIONS

Han et al. (translated CN109582875) (Year: 2019).*
Tencent Technology, JP Office Action, Japanese Patent Application No. 2021-533463, Aug. 23, 2022, 6 pgs.
Tencent Technology, WO, PCT/CN2020/089543, Aug. 11, 2020, 4 pgs.
Tencent Technology, IPRP, PCT/CN2020/089543, Nov. 16, 2021, 5 pgs.
Extended European Search Report, EP20770930.4, May 10, 2022, 9 pgs.
Yiren Zhou et al., "Adaptive Quantization for Deep Neural Network", The Thirty-Second AAAI Conference on Artificial Intelligence (AAAI-18), Apr. 29, 2018, XP055916707, 9 pgs., Retrieved from the Internet: https://ojs.aaai.org/index.php/AAAI/%20article/view/11623.
Tencent Technology, ISR, PCT/CN2020/089543, Aug. 11, 2020, 2 pgs.

* cited by examiner

METHOD AND APPARATUS FOR OPTIMIZING QUANTIZATION MODEL, ELECTRONIC DEVICE, AND COMPUTER STORAGE MEDIUM

CROSS-REFERENCE TO RELATED APPLICATIONS

This application is a continuation application of PCT Patent Application No. PCT/CN2020/089543, filed on May 11, 2020, entitled "METHOD AND APPARATUS FOR OPTIMIZING QUANTIZATION MODEL, ELECTRONIC DEVICE, AND COMPUTER STORAGE MEDIUM," which claims priority to Chinese Patent Application No. 201910390616.7, entitled "METHOD AND APPARATUS FOR OPTIMIZING QUANTIZATION MODEL, ELECTRONIC DEVICE, AND COMPUTER STORAGE MEDIUM" filed with the National Intellectual Property Administration, PRC on May 10, 2019, all of which are incorporated by reference herein in their entirety.

FIELD OF THE TECHNOLOGY

This application relates to the field of machine learning technologies of artificial intelligence (AI), and specifically, to a method and apparatus for optimizing a quantization model, an electronic device, and a computer storage medium.

BACKGROUND OF THE DISCLOSURE

With the development of computer technologies, neural network models receive more attention and are more widely used. For example, neural network models are applied to information recognition and recommendation and user behavior prediction, Generally, before a neural network model is used for recommendation and prediction, the neural network model needs to be trained offline in advance by using a large amount of training data, so that in a process of online actual use, the neural network model has a capability of recommendation and prediction for data generated in an actual application scenario, other than the training data.

Currently, in the process of online actual use, a user and a product produce new behavior, such as emergence of a new occupation and generation of a new work. The new behavior is generally represented as a new data feature in data. However, after being trained offline, the neural network model generally learns the new data feature based on an initial algorithm (e.g., an original optimization algorithm) of the neural network model. Consequently, the neural network model has problems such as a weak learning capability and low accuracy of recommendation and prediction.

SUMMARY

To resolve at least one of the foregoing technical defects, this application proposes the following technical solutions.

In accordance with some embodiments of the present disclosure, an optimization method is performed at an electronic device (e.g., an apparatus, a computing device, etc.). The method comprises:

determining jump ratios of embedding layer parameters of a trained quantization model in a predetermined time range, the quantization model being a neural network model obtained after quantization processing on the embedding layer parameters;

determining a jump curve in the predetermined time range according to the jump ratios, and fitting the jump curve to obtain a corresponding time scaling parameter; and optimizing an initial algorithm (e.g., an original optimization algorithm) of the quantization model based on the time scaling parameter to obtain an optimized target optimization algorithm, and training the quantization model based on the target optimization algorithm.

In accordance with some embodiments of the present disclosure, an apparatus for optimizing a quantization model comprises:

a first determining module, configured to determine jump ratios of embedding layer parameters of a trained quantization model in a predetermined time range, the quantization model being a neural network model obtained after quantization processing on the embedding layer parameters;

a first processing module, configured to determine a jump curve in the predetermined time range according to the jump ratios, and fit the jump curve to obtain a corresponding time scaling parameter; and a second processing module, configured to optimize an initial algorithm an original optimization algorithm) of the quantization model based on the time scaling parameter to obtain an optimized target optimization algorithm, and train the quantization model based on the target optimization algorithm.

In accordance with some embodiments of the present disclosure, an information recommendation method based on an optimized quantization model comprises:

acquiring user behavior data in a predetermined time period;

learning the user behavior data based on the optimized quantization model obtained by using the method for optimizing a quantization model, and determining a user behavior feature corresponding to the user behavior data; and determining target recommendation information based on the user behavior feature, and recommending the target recommendation information.

In accordance with another aspect of the present disclosure, an information recommendation apparatus based on an optimized quantization model is provided, including:

an acquisition module, configured to acquire user behavior data in a predetermined time period;

a second determining module, configured to learn the user behavior data based on the optimized quantization model obtained by using the method for optimizing a quantization model, and determine a user behavior feature corresponding to the user behavior data; and a recommendation module, configured to determine target recommendation information based on the user behavior feature, and recommend the target recommendation information.

In accordance with some embodiments of the present disclosure, a method for optimizing a neural network model comprises:

determining an original learning rate parameter of a neural network model, the neural network model being a quantization model or an original model (e.g., an initial model) of the quantization model before quantization;

determining confidence of embedding layer parameters of the neural network model according to jump ratios, the jump ratios being the jump ratios, in the predetermined time range, of the embedding layer parameters of the trained quantization model obtained by using the method for optimizing a quantization model; and adjusting the original learning rate parameter according to the confidence, to optimize the neural network model.

In accordance with some embodiments of the present disclosure, an apparatus for optimizing a neural network model comprises:

a third determining module, configured to determine an original learning rate parameter of a neural network model, the neural network model being a quantization model or an original model of the quantization model before quantization;

a fourth determining module, configured to determine confidence of embedding layer parameters of the neural network model according to jump ratios, the jump ratios being the jump ratios, in the predetermined time range, of the embedding layer parameters of the trained quantization model obtained by using the method for optimizing a quantization model; and an optimization module, configured to adjust the original learning rate parameter according to the confidence, to optimize the neural network model.

In accordance with some embodiments of the present disclosure, an electronic device (e.g., a computing device) comprises one or more processors and memory. The memory stores one or more programs that, when executed by the one or more processors, cause the one or more processors to perform any of the methods disclosed herein.

In accordance with some embodiments of the present disclosure, a non-transitory computer-readable storage medium stores one or more programs. The one or more programs include instructions that, when executed by one or more processors of an electronic device, cause the one or more processors to perform any of the methods disclosed herein.

According to the method for optimizing a quantization model provided in the embodiments of this application, a jump curve corresponding to jump ratios of embedding layer parameters of a trained quantization model in a predetermined time range is determined. An original optimization algorithm e.g., an initial algorithm) of the quantization model is optimized according to a time scaling parameter obtained by fitting the jump curve. The quantization model is trained based on the optimized original optimization algorithm. In this way, a time parameter is fully considered during optimization of the original optimization algorithm, so that the quantization model can quickly learn a new data feature in an online use process, thereby improving an online prediction capability of the quantization model and accuracy of online prediction and recommendation based on the quantization model.

According to the information recommendation method based on an optimized quantization model provided in the embodiments of this application, acquired user behavior data in a predetermined time period is learned based on the optimized quantization model. In accordance with the acquired user behaviors data, a user behavior feature corresponding to the user behavior data is determined, and target recommendation information is recommended based on the user behavior feature. In this way, a recommendation system based on the optimized quantization model can quickly learn a new data feature according to specific behavior data of the user in the predetermined time period, thereby improving an online prediction capability of the quantization model and accuracy of online prediction and recommendation based on the quantization model.

According to the method for optimizing a neural network model provided in the embodiments of this application, confidence corresponding to jump ratios is determined, and a learning rate parameter of a neural network model is adjusted according to the confidence, to optimize the neural network model. In this way, the neural network model can quickly learn a new data feature, thereby improving an online prediction capability of the quantization model and accuracy of online prediction and recommendation based on the quantization model.

BRIEF DESCRIPTION OF THE DRAWINGS

The foregoing and/or additional aspects and advantages of this application will become apparent and comprehensible in the description of embodiments made with reference to the following accompanying drawings.

DESCRIPTION OF EMBODIMENTS

Figure 1A:
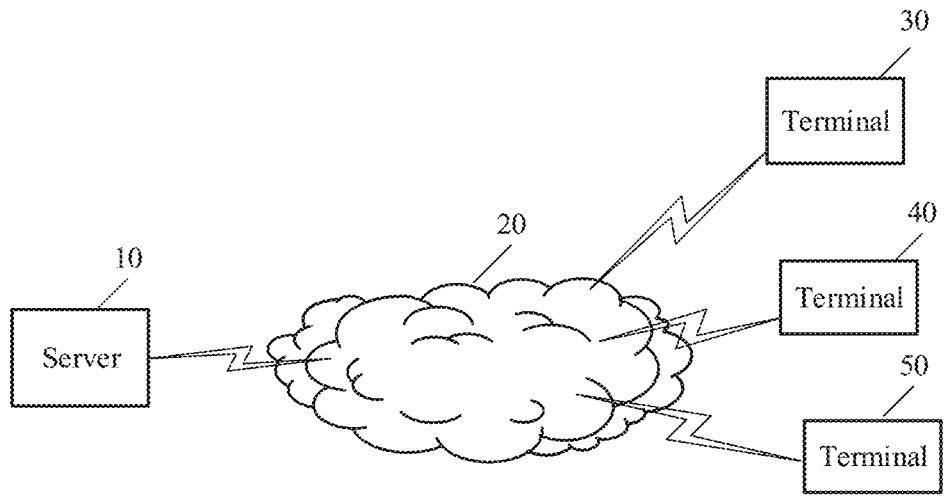
FIG. 1A is a schematic diagram of an application scenario according to an embodiment of this application.

Embodiments of this application are described in detail below, and examples of the embodiments are shown in accompanying drawings, where the same or similar elements or the elements having same or similar functions are denoted by the same or similar reference numerals throughout the description. The embodiments that are described below with reference to the accompanying drawings are exemplary, and are only used to interpret this application and cannot be construed as a limitation to this application.

A person skilled in the art may understand that, the singular forms "a", "an", "said", and "the" used herein may include the plural forms as well, unless the context clearly indicates otherwise. It is to be further understood that, the terms "include" and/or "comprise" used in this specification of this application refer to the presence of stated features, integers, steps, operations, elements, and/or components, but do not preclude the presence or addition of one or more other features, integers, steps, operations, elements, components, and/or combinations thereof. It is to be understood that, when an element is "connected" or "coupled" to another element, the element may be directly connected to or coupled to another element, or an intermediate element may exist. In addition, the "connection" or "coupling" used herein may include a wireless connection or a wireless coupling. The term "and/or" used herein includes all of or any of units and all combinations of one or more related listed items.

To make objectives, technical solutions, and advantages of this application clearer, the following further describes implementations of this application in detail with reference to the accompanying drawings.

A method and apparatus for optimizing a quantization model, an electronic device, and a computer-readable storage medium provided in this application aim to resolve the foregoing technical problems of the related art.

The following describes the technical solutions of this application and how to resolve the foregoing technical problems according to the technical solutions of this application in detail by using specific embodiments. The following several specific embodiments may be combined with each other, and the same or similar concepts or processes may not be described repeatedly in some embodiments. The following describes the embodiments of this application with reference to the accompanying drawings.

AI is a theory, a method, a technology, and an application system that uses a digital computer or a machine controlled by a digital computer to simulate, extend, and expand human intelligence, perceive an environment, obtain knowledge, and obtain an optimal result through the knowledge. In other words, AI is a comprehensive technology of computer sciences, attempts to understand essence of intelligence, and produces a new intelligent machine that can react in a manner similar to human intelligence. AI is to study design principles and implementation methods of various intelligent machines, to enable the machines to have functions of perception, reasoning, and decision-making.

The AI technology is a comprehensive discipline, and relates to a wide range of fields including both a hardware-level technology and a software-level technology. Basic AI technologies generally include technologies such as a sensor, a dedicated AI chip, cloud computing, distributed storage, a big data processing technology, an operating/interaction system, and electromechanical integration. AI software technologies mainly include several major directions such as computer vision (CV) technology, speech processing technology, natural language processing technology, and machine learning (ML)/deep learning.

Computer vision (CV) is a science that studies how to enable a machine to "see". Furthermore, CV means that using a camera and a computer to replace human eyes to perform machine vision such as recognition, tracking, and measurement on a target, and further perform graphic processing, so that the computer processes the target into an image more suitable for human eyes to observe, or into an image to be transmitted to an instrument for detection. As a scientific discipline, CV studies related theories and technologies and attempts to establish an AI system that can obtain information from images or multidimensional data, CV technologies usually include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biological feature recognition technologies such as common face recognition and fingerprint recognition.

Key technologies of speech technology include an automatic speech recognition (ASR) technology, a text-to-speech (TTS) technology, and a voiceprint recognition technology. To make a computer capable of listening, seeing, speaking, and feeling is the future development direction of human-computer interaction, and speech has become one of the most promising human-computer interaction methods in the future.

Nature language processing (NLP) is an important direction in the fields of computer science and AI. NLP studies various theories and methods for implementing effective communication between human and computers through natural languages. NLP is a science that integrates linguistics, computer science, and mathematics. Therefore, studies in this field relate to natural languages, that is, languages used by people in daily life, and NLP is closely related to linguistic studies. The NLP technology generally includes technologies such as text processing, semantic understanding, machine translation, robot question and answer, and knowledge graph.

ML is a multi-field interdiscipline, and relates to a plurality of disciplines such as the probability theory, statistics, the approximation theory, convex analysis, and the algorithm complexity theory. ML specializes in studying how a computer simulates or implements a human learning behavior to obtain new knowledge or skills, and reorganize an existing knowledge structure, so as to keep improving performance of the computer. The machine learning is a core of the AI, is a basic way to make the computer intelligent, and is applied to various fields of the AI. The ML and deep learning generally include technologies such as an artificial neural network, a belief network, reinforcement learning, transfer learning, inductive learning, and learning from demonstrations.

Self-driving technologies have a wide application prospect, and generally include a high-precision map, environment perception, behavior decision-making, path planning, motion control, and the like.

With the research and progress of the AI technology, the AI technology is studied and applied in a plurality of fields, such as a common smart home, a smart wearable device, a virtual assistant, a smart speaker, smart marketing, unmanned driving, self-driving, an unmanned aerial vehicle, a robot, smart medical care, and smart customer service. It is believed that with the development of technologies, the AI technology will be applied in more fields, and play an increasingly important role.

The solutions provided in the embodiments of this application involve technologies such as machine learning of AI, and are specifically described by using the following embodiments.

Figure 1B:
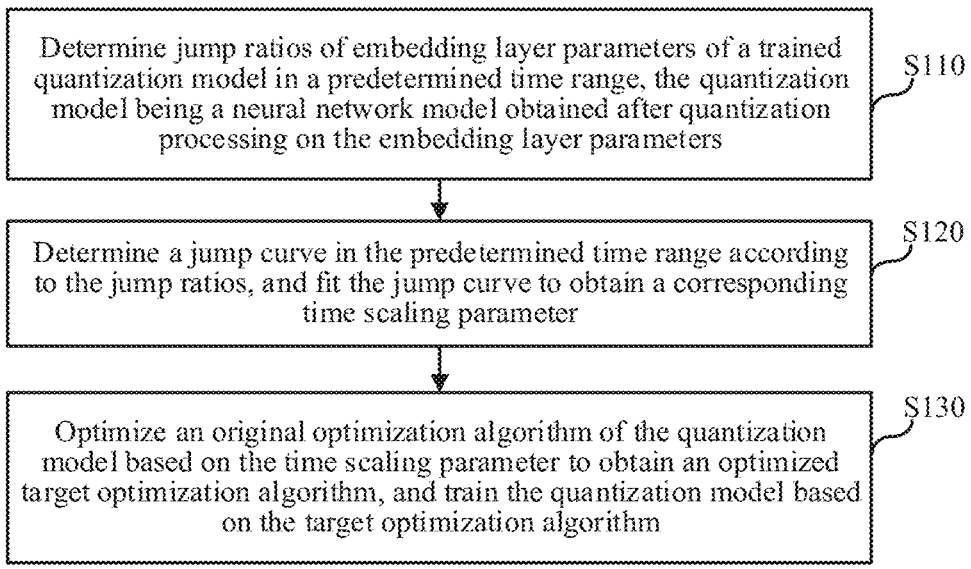
FIG. 1B is a schematic flowchart of a method for optimizing a quantization model according to an embodiment of this application.

An embodiment of this application provides a method for optimizing a quantization model. The method is applicable to a computer device. The computer device may be a terminal or a server, for example, a server 10 shown in FIG. 1A, or a terminal 30, 40, or 50 communicating with the server 10 by using a network 20. The terminal 30, 40, or 50 may be a desktop device or a mobile terminal. The server 10 may be an independent physical server, a physical server cluster, or a virtual server. As shown in FIG. 1, the method includes the following steps:

Step S110: Determine jump ratios of embedding layer parameters of a trained quantization model in a predetermined time range, the quantization model being a neural network model obtained after quantization processing on the embedding layer parameters.

In some embodiments, a neural network model whose embedding layer parameters are quantized may be trained offline in advance to obtain a trained quantization model, so that in a process of using the trained quantization model, the trained quantization model has a capability of recommendation and prediction for data generated in an actual application scenario, other than training data. Quantization refers to a process of converting multi-bit high-precision values into a finite quantity of low-precision values. Quantization processing is performed on the embedding layer parameters of the neural network model, so that a high-dimensional sparse embedding layer may be quantized, and precision of a low-dimensional dense neural network (DNN) model is retained. In this way, a size of the neural network model may be reduced, and prediction performance of the neural network model may be improved.

In some embodiments, in a process of using the trained quantization model, the embedding layer parameters of the trained quantization model jump in the predetermined time range according to new behavior or new data generated by a user or a product in an actual application scenario. The new behavior or the new data may be, for example, browsing of a new video, viewing of a new picture, and generation of a new work. The predetermined time range may be, for example, 1 hour, 12 hours, 24 hours, one week, or one month. For example, the predetermined time range is 24 hours, and the embedding layer parameters may jump in 24 hours according to new behavior generated by a user or a product in an actual application scenario.

In some embodiments, the quantization model generally has a plurality of embedding layer parameters. In the predetermined time range, embedding layer parameters that jump each time may be the same or different. In addition, in the predetermined time range, quantities of embedding layer parameters that jump each time may be the same or different. The jump ratio is a ratio of a quantity of embedding layer parameters that jump to a total quantity of embedding layer parameters. Assume that the predetermined time range is 24 hours, and the total quantity of embedding layer parameters is 20. In this case, if a quantity of embedding layer parameters that currently jump is 10, the jump ratio is 10/20=0.5; if a quantity of embedding layer parameters that currently jump is 5, the jump ratio is 5/20=0.25; and if a quantity of embedding layer parameters that currently jump is 1, the jump ratio is 1/20=0.05.

Step S120: Determine a jump curve in the predetermined time range according to the jump ratios, and fit the jump curve to obtain a corresponding time scaling parameter.

In some embodiments, after the jump ratios in the predetermined time range are obtained, the jump curve in the predetermined time range may be drawn according to the jump ratios. During drawing of the jump curve, the predetermined time range may be taken as an abscissa, and each jump ratio may be taken as an ordinate, to draw a discrete point of each jump ratio. The discrete points are connected to obtain the jump curve in the predetermined time range.

In some embodiments, after the jump curve in the predetermined time range is obtained, the jump curve may be fitted to obtain the time scaling parameter corresponding to the jump curve, to provide a prerequisite for subsequent optimization on an original optimization algorithm (e.g., an initial algorithm) of the quantization model.

Step S130: Optimize an original optimization algorithm (e.g., an initial algorithm) of the quantization model based on the time scaling parameter to obtain an optimized target optimization algorithm, and train the quantization model based on the target optimization algorithm.

In some embodiments, after the time scaling parameter corresponding to the jump curve is obtained, the original optimization algorithm of the quantization model may be optimized based on the time scaling parameter, to obtain the optimized target optimization algorithm. The original optimization algorithm in this embodiment of this application is an algorithm for optimizing a parameter of the neural network model according to a loss function.

In some embodiments, after the optimized target optimization algorithm is obtained, the quantization model may be trained based on the target optimization algorithm, so that the quantization model can quickly learn online a data feature of new data generated in an actual application scenario.

According to the method for optimizing a quantization model provided in the embodiments of this application, a jump curve corresponding to jump ratios of embedding layer parameters of a trained quantization model in a predetermined time range is determined, an original optimization algorithm (e.g., an initial algorithm) of a quantization model is optimized according to a time scaling parameter obtained by fining the jump curve, and the quantization model is trained based on the optimized original optimization algorithm. In this way, a time parameter is fully considered during optimization of the original optimization algorithm, so that the quantization model can quickly learn a new data feature in an online use process, thereby improving an online prediction capability of the quantization model and accuracy of online prediction and recommendation based on the quantization model.

In an exemplary implementation of this embodiment of this application, the quantization processing on the embedding layer parameters includes N-valued quantization processing on the embedding layer parameters, N being an integer greater than 1.

In some embodiments, in actual application, the quantization processing on the embedding layer parameters may be feasible quantization processing such as two-valued quantization processing, three-valued quantization processing, four-valued quantization processing, or five-valued quantization processing. This is not limited in this embodiment of this application.

In some embodiments, the two-valued quantization processing is quantizing parameters into 0 and 1, or −1 and 0, or −1 and 1 according to comparison between parameter values and a quantization threshold. This is not limited in this embodiment of this application. Using 0 and 1 as an example, if a parameter value is greater than or equal to the quantization threshold, the parameter is quantized into 1; and if a parameter value is less than the quantization threshold, the parameter is quantized into 0.

In some embodiments, the three-valued quantization processing is quantizing parameters into a form of −1, 0, and 1 according to comparison between parameter values and a quantization threshold. Certainly, the parameters may alternatively be quantized into another numerical form as required, such as 0, 1 and 2. This is not limited in this embodiment of this application. Using −1, 0, and 1 as an example, if the quantization threshold is 0.001, when a parameter value is less than −0.001, the parameter is quantized into −1; when a parameter value is greater than or equal to −0.001 and less than or equal to 0.001, the parameter is quantized into 0; and when a parameter value is greater than 0.001, the parameter is quantized into 1.

Processes of the four-valued quantization processing, the five-valued quantization processing, and the like are similar to those of the two-valued quantization processing and the three-valued quantization processing, and details are not described herein.

The following uses the three-valued quantization processing with a quantization result of −1, 0, and 1 as an example to specifically describe this embodiment of this application.

In some embodiments, in actual application, the jump ratios of the embedding layer parameters of the trained quantization model in the predetermined time range may be determined by determining a jump ratio corresponding to a parameter jump of the embedding layer parameters in each predetermined time interval in the predetermined time range. Assume that the predetermined time range is 24 hours of a day, and the predetermined time intervals are respectively 0:00 to 3:00, 3:00 to 6:00, 6:00 to 9:00, 9:00 to 12:00, 12:00 to 15:00, 15:00 to 18:00, 18:00 to 21:00, and 21:00 to 24:00. In this case, the jump ratios of the embedding layer parameters in the predetermined time range may be obtained by determining jump ratios corresponding to embedding layer parameter jumps of the embedding layer parameters in the predetermined time intervals 0:00 to 3:00, 3:00 to 6:00, 6:00 to 9:00, 9:00 to 12:00, 12:00 to 15:00, 15:00 to 18:00, 18:00 to 21:00, and 21:00 to 24:00.

Embedding layer parameters that jump in each predetermined time interval may be the same or different, and quantities of embedding layer parameters that jump each time may be the same or different. The jump ratio is a ratio of a quantity of embedding layer parameters that jump to a total quantity of embedding layer parameters. In addition, the embedding layer parameter jump is an embedding layer parameter jump between −1, 0, and 1, for example, a jump from −1 to 1, a jump from −1 to 0, a jump from 0 to 1, a jump from 0 to −1, a jump from 1 to 0, or a jump from 1 to −1.

In some embodiments, assume that a jump ratio of the embedding layer parameters in the predetermined time interval 0:00 to 3:00 is 0.05, a jump ratio of the embedding layer parameters in the predetermined time interval 3:00 to 6:00 is 0.04, a jump ratio of the embedding layer parameters in the predetermined time interval 6:00 to 9:00 is 0.03, a jump ratio of the embedding layer parameters in the predetermined time interval 9:00 to 12:00 is 0.02, a jump ratio of the embedding layer parameters in the predetermined time interval 12:00 to 15:00 is 0.02, a jump ratio of the embedding layer parameters in the predetermined time interval 15:00 to 18:00 is 0.01, a jump ratio of the embedding layer parameters in the predetermined time interval 18:00 to 21:00 is 0.01, and a jump ratio of the embedding layer parameters in the predetermined time interval 21:00 to 24:00 is 0.016. In this case, it may be obtained that the jump ratios of the embedding layer parameters in 24 hours of a day are respectively 0.05, 0.04, 0.03, 0.02, 0.02, 0.01, 0.01, and 0.01.

In some embodiments, in a process of determining a jump ratio of a parameter jump of the embedding layer parameters in any predetermined time interval, a quantity of parameters that jump in the embedding layer parameters in the any predetermined time interval, relative to the embedding layer parameters in a previous predetermined time interval of the any predetermined time interval may be first determined, and then the jump ratio of the parameter jump of the embedding layer parameters in the any predetermined time interval is determined according to the quantity of parameters and a total quantity of embedding layer parameters.

The following specifically describes a process of determining a quantity of parameters that jump in each predetermined time interval by using an example in which the predetermined time range is 24 hours of a day, and the predetermined time intervals are respectively 0:00 to 3:00, 3:00 to 6:00, 6:00 to 9:00, 9:00 to 12:00, 12:00 to 15:00, 15:00 to 18:00, 18:00 to 21:00, and 21:00 to 24:00. Assume that the total quantity of embedding layer parameters is 100. If a quantity of parameters that jump in the embedding layer parameters in the predetermined time interval 0:00 to 3:00, relative to the embedding layer parameters in a previous predetermined time interval (that is, 21:00 to 24:00 on a previous day) of the any predetermined time interval (that is, 0:00 to 3:00) is 5, the jump ratio of the embedding layer parameters in the predetermined time interval 0:00 to 3:00 is 5/100=0.05. If a quantity of parameters that jump in the embedding layer parameters in the predetermined time interval 3:00 to 6:00, relative to the embedding layer parameters in a previous predetermined time interval (that is, 0:00 to 3:00) of the any predetermined time interval (that is, 3:00 to 6:00) is 4, the jump ratio of the embedding layer parameters in the predetermined time interval 3:00 to 6:00 is 4/100=0.04. Similarly, corresponding jump ratios of the embedding layer parameters in the predetermined time intervals 6:00 to 9:00, 9:00 to 12:00, 12:00 to 15:00, 15:00 to 18:00, 18:00 to 21:00, and 21:00 to 24:00 may be obtained.

Figure 2:
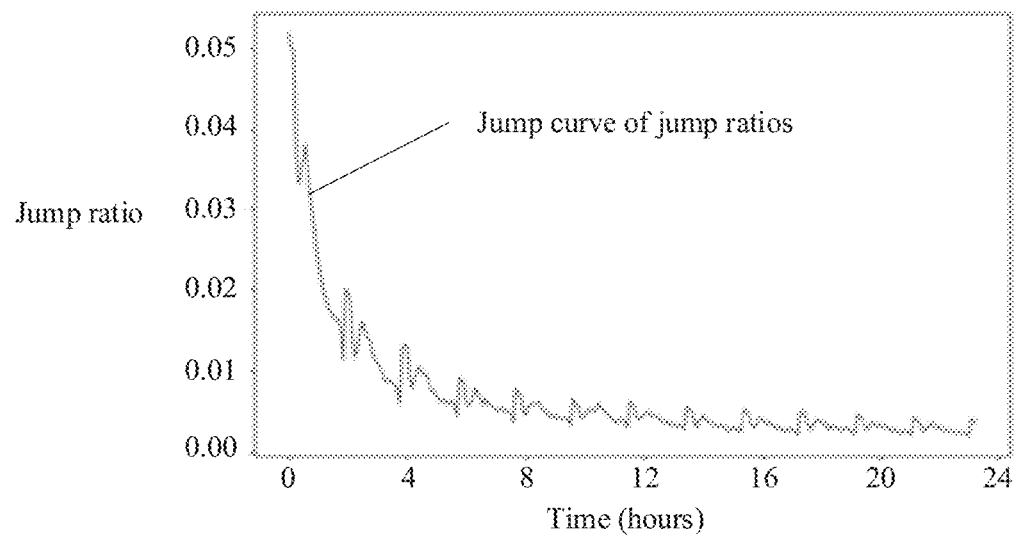
FIG. 2 is a schematic diagram of a jump curve corresponding to jump ratios in a predetermined time range according to an embodiment of this application.
Figure 3:
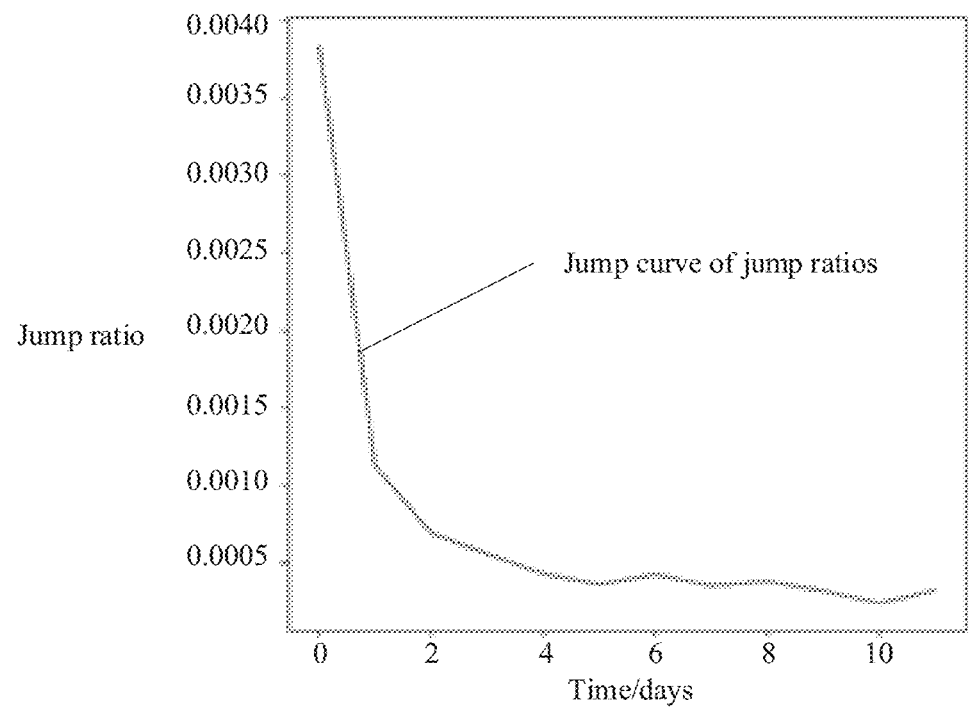
FIG. 3 is a schematic diagram of a curve of jump ratios in the same predetermined time interval of different dates according to an embodiment of this application.

In some embodiments, after the jump ratios in the predetermined time range are obtained, the jump curve in the predetermined time range may be drawn according to the jump ratios, as shown in FIG. 2. In FIG. 2, an abscissa is a time, and an ordinate is a jump ratio. Based on the curve in FIG. 2, it may be observed that there are some periodic changes, because data in different time intervals of the day usually has different features. For example, a user likes to watch a weather forecast in the morning and news in the evening. However, there is usually consistency in the same predetermined time intervals of different dates. For example, a user who watches a weather forecast this morning usually watches the weather forecast tomorrow morning. In this case, jump ratios of the embedding layer parameters in the same predetermined time intervals of different dates are drawn into a corresponding jump curve, which has a more obvious change regularity, as shown in FIG. 3.

In an exemplary implementation of this embodiment of this application, after the jump curve of the embedding layer parameters in the predetermined time range is drawn, the jump curve may be fitted to obtain the corresponding time scaling parameter.

Figure 4:
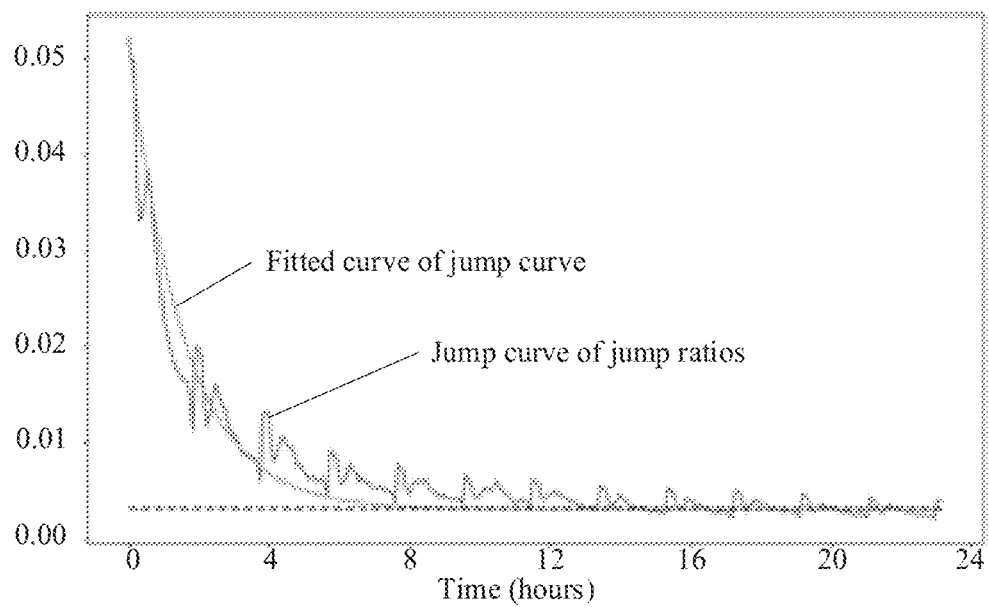
FIG. 4 is a schematic diagram of fitting a curve of jump ratios according to an embodiment of this application.
Figure 5:
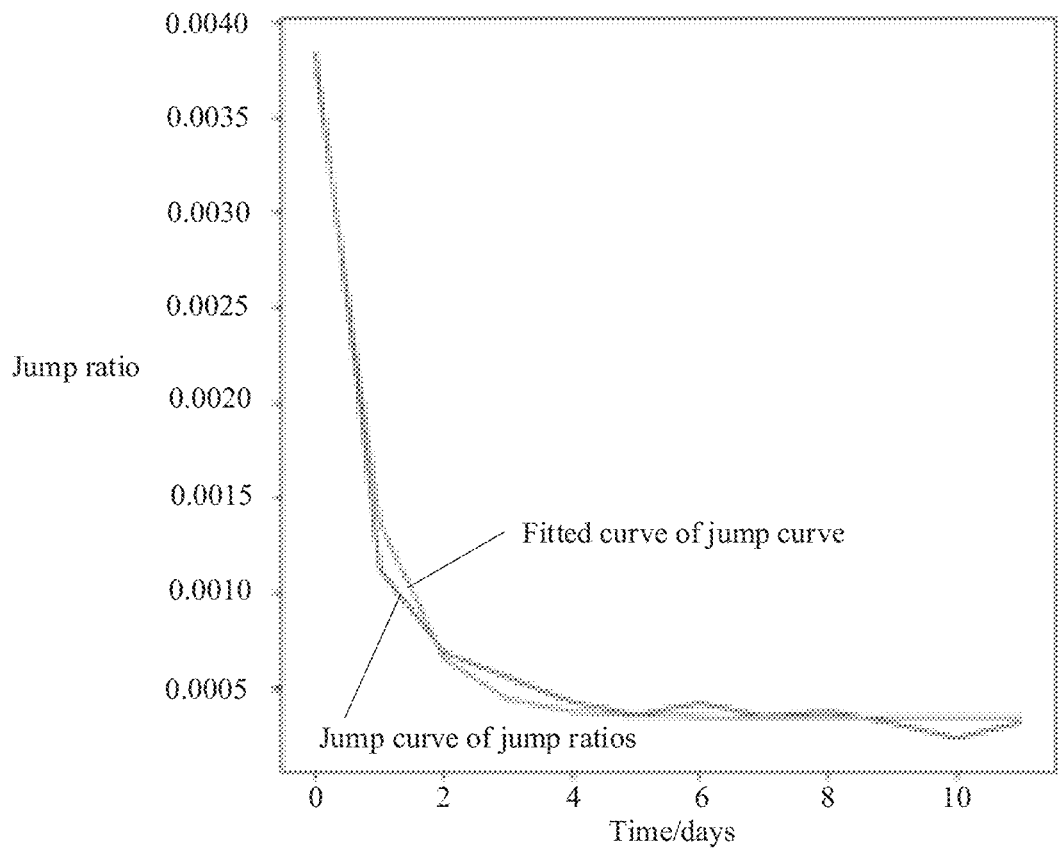
FIG. 5 is another schematic diagram of fitting a curve of jump ratios according to an embodiment of this application.

In some embodiments, in a process of fitting the jump curve, a curve type of the jump curve may be first determined according to a change trend of the drawn jump curve, a fitting function corresponding to the curve type is determined, and then the jump curve is fitted according to the determined fitting function to obtain the corresponding time scaling parameter. Based on the jump curves in FIG. 2 and FIG. 3, it may be learned that the change trend of the jump curve is similar to that of an exponential function. Therefore, it may be determined that the curve type of the jump curve is an exponential function curve, and it may be determined that the fitting function corresponding to the curve type is an exponential function. The jump curve is fitted according to the exponential function to obtain the corresponding time scaling parameter. A fitted curve obtained after exponential function fitting is performed on the jump curve in FIG. 2 is shown in FIG. 4, and a fitted curve obtained after exponential function fitting is performed on the jump curve in FIG. 3 is shown in FIG. 5.

In some embodiments, in actual application, if the change trend of the drawn jump curve is similar to that of a logarithmic function, it may be determined that the curve type of the jump curve is a logarithmic function curve, and it may be determined that the fitting function corresponding to the curve type is a logarithmic function. The jump curve is fitted according to the logarithmic function to obtain the corresponding time scaling parameter. If the change trend of the drawn jump curve is similar to that of a power function, it may be determined that the curve type of the jump curve is a power function curve, and it may be determined that the fitting function corresponding to the curve type is a power function. The jump curve is fitted according to the power function to obtain the corresponding time scaling parameter.

In some embodiments, after the corresponding time scaling parameter is obtained, a learning rate parameter in the original optimization algorithm of the quantization model may be optimized according to the obtained time scaling parameter, to obtain an optimized learning rate parameter. The learning rate parameter in the original optimization algorithm of the quantization model may be optimized by updating the learning rate parameter in the original optimization algorithm to a product of the learning rate parameter and the time scaling parameter. That is, the optimized learning rate parameter is the product of the learning rate parameter in the original optimization algorithm and the time scaling parameter.

Assume that the original optimization algorithm of the quantization model is $v_i^{t_i} = v_i^{t_i-1} - \alpha \times g^{t_i}$. g indicates a gradient or a moment estimation; $t_i$ indicates a timestamp of an update of the embedding layer parameters, which may be a quantity of update times of the embedding layer parameters; $\alpha$ is the learning rate parameter, which is a hyperparameter whose value is predetermined; $v_i^{t_i-1}$ indicates a parameter value of a previous predetermined time interval of a current predetermined time interval; and $v_i^{t_i}$ indicates an embedding layer parameter value of the current predetermined time interval. In addition, assume that the time scaling parameter obtained through fitting is in a form of $1+\mu\lambda^{t_i}$, and $\mu$ and $\lambda$ are hyperparameters. In this case, it may be obtained that the optimized learning rate parameter is $\alpha(1+\mu\lambda^{t_i})$. If the optimized learning rate parameter is denoted as $\alpha_i^{t_i}$, $\alpha_i^{t_i} = \alpha(1+\mu\lambda^{t_i})$. Then, it is further obtained that the optimized target optimization algorithm is $v_i^{t_i} = v_i^{t_i-1} - \alpha_i^{t_i} \times g^{t_i}$.

In some embodiments, assume that the time scaling parameter obtained through fitting is in the form of $1+\mu\lambda^{t_i}$. In this case, in a process of training the quantization model based on the target optimization algorithm, if a convergence speed of the quantization model is less than a predetermined speed threshold or a preset condition related to the convergence speed is met, $\mu$ or $\lambda$ may be appropriately increased, that is, the time scaling parameter may be appropriately increased; and if precision of the quantization model is less than a predetermined precision threshold or a preset condition related to the precision is met, $\mu$ or $\lambda$ may be appropriately decreased, that is, the time scaling parameter may be appropriately decreased.

Figure 6:
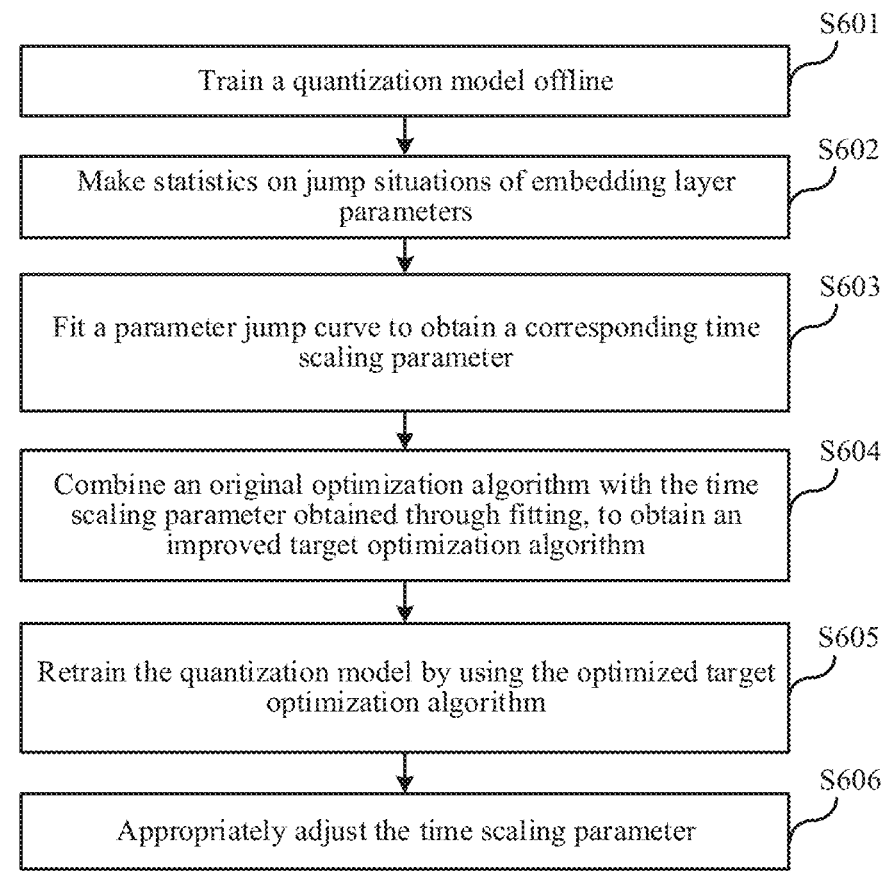
FIG. 6 is a schematic diagram showing a process of optimizing a quantization model according to an embodiment of this application.

In some embodiments, FIG. 6 is a schematic diagram showing a process of optimizing a quantization model according to an embodiment of this application. In FIG. 6, step S601: Train the quantization model offline. That is, in an offline scenario, a neural network model obtained after quantization processing on embedding layer parameters is trained by using sample data until the neural network model converges, to obtain a trained quantization model.

Step S602: Make statistics on jump situations of the embedding layer parameters.

There are two feasible solutions for making statistics on the jump situations of the embedding layer parameters. One solution is: saving, in chronological order, data generated by a user or a product in an online actual application scenario in a predetermined time range, and then inputting the saved data to the quantization model trained offline and determining the jump situations of the embedding layer parameters of the quantization model trained offline; or inputting, as training data for training, the saved data to the neural network model obtained after the quantization processing on the embedding layer parameters, and determining the jump situations of the embedding layer parameters in the training process. The other solution is: applying the quantization model trained offline to an online actual application scenario, and determining, according to data generated by a user or a product in the online actual application scenario, a jump ratio corresponding to a parameter jump of the embedding layer parameters in each predetermined time interval in the predetermined time range in real time.

Step S603: Fit a parameter jump curve to obtain a corresponding time scaling parameter.

That is, after jump ratios in the predetermined time range are obtained, the jump curve in the predetermined time range is drawn according to the jump ratios. A curve type of the jump curve is determined according to a change trend of the drawn jump curve, and a fitting function corresponding to the curve type is determined. The jump curve is fitted according to the determined fitting function to obtain the corresponding time scaling parameter.

Step S604: Combine an original optimization algorithm with the time scaling parameter obtained through fitting, to obtain an improved target optimization algorithm.

That is, according to the obtained time scaling parameter, a learning rate parameter in the original optimization algorithm is updated to a product of the learning rate parameter and the time scaling parameter, to obtain an optimized learning rate parameter. Then, an optimized target optimization algorithm is obtained.

Step S605: Retrain the quantization model by using the optimized target optimization algorithm, so that the quantization model may be trained online to enable the quantization model to quickly learn a new data feature in an online application process according to the target optimization algorithm, thereby improving an online prediction capability and recommendation accuracy.

Step S606: Appropriately adjust the time scaling parameter to enable the quantization model to achieve better results.

In an actual application process, when there is a training prior value or experience value as a reference, the time scaling parameter such as $(1+\mu\lambda^{t_i})$ may be directly considered in the optimization algorithm, with no need to perform step S601 and step S602.

Figure 7:
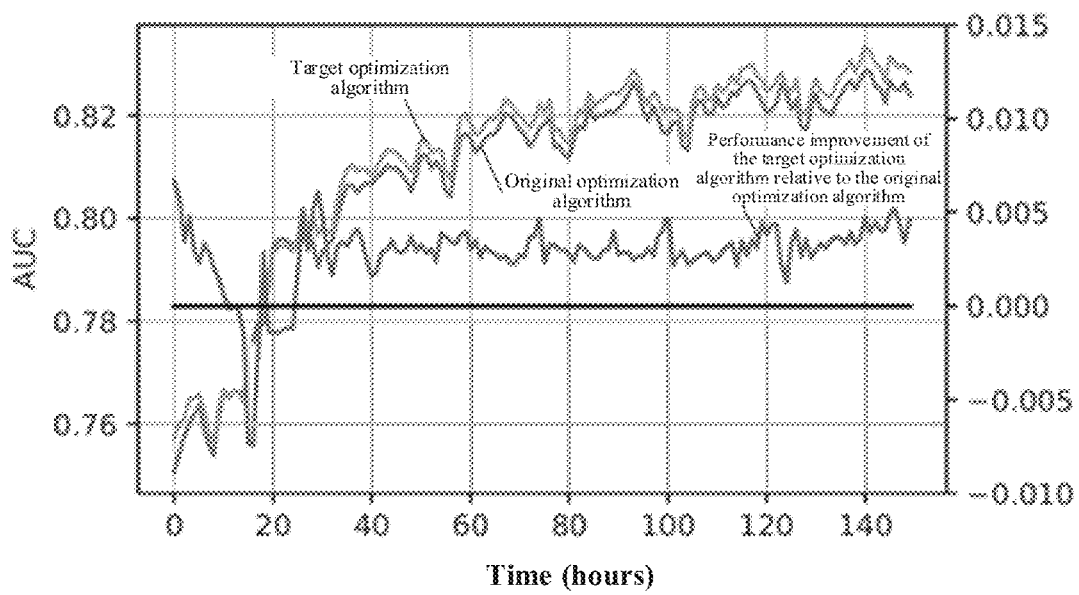
FIG. 7 is a schematic diagram of a comparison result between an original optimization algorithm (e.g., an initial algorithm) and a target optimization algorithm according to an embodiment of this application.

FIG. 7 shows a schematic diagram of a comparison result between the original optimization algorithm and the target optimization algorithm. FIG. 7 shows an area under curve (AUC) curve of the quantization model. Based on the AUC curve in FIG. 7, it may be learned that relative to the original optimization algorithm, the target optimization algorithm in this embodiment of this application implements a relatively stable improvement of 2% to 6% after about 24 hours of data. This result further shows that the target optimization algorithm in this embodiment of this application enables the quantization model to better adapt to generation of a new data feature and changes over time in an online scenario, thereby helping improve an online learning capability and recommendation accuracy of the quantization model.

Figure 8:
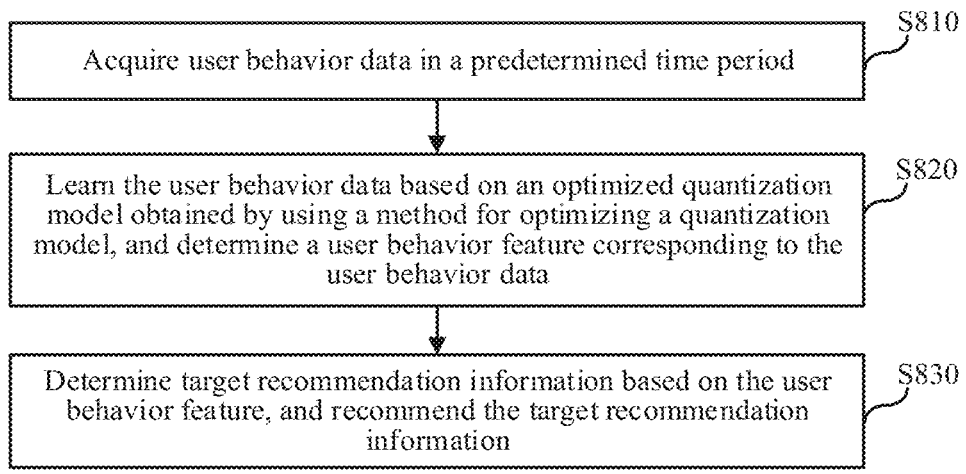
FIG. 8 is a schematic flowchart of an information recommendation method based on an optimized quantization model according to an embodiment of this application.

Another embodiment of this application provides an information recommendation method based on an optimized quantization model. The method is applicable to a computer device, and the computer device may be a terminal or a server. The terminal may be a desktop device or a mobile terminal. The server may be an independent physical server, a physical server cluster, or a virtual server. As shown in FIG. 8, the method may include the following steps:

Step S810: Acquire user behavior data in a predetermined time period.

Step S820: Learn the user behavior data based on the optimized quantization model obtained by using the method for optimizing a quantization model, and determine a user behavior feature corresponding to the user behavior data.

Step S830: Determine target recommendation information based on the user behavior feature, and recommend the target recommendation information.

In some embodiments, a recommendation system of the computer device may use the optimized quantization model to online acquire user behavior data in a predetermined time period in real time, for example, acquire user behavior data of a user browsing shopping web pages and viewing news in a predetermined time period from 12:00 to 13:00, or acquire user behavior data of a user browsing videos and viewing web pages in a predetermined time period from 20:00 to 22:00. The recommendation system is a system for recommending information, commodities, and the like in a personalized manner according to user features such as user needs and hobbies. Unless otherwise specified, the "recommendation system" is a system that recommends information such as web pages, images and text, and videos.

In some embodiments, after the user behavior data in the predetermined time period is obtained, the user behavior data may be learned according to the optimized quantization model obtained in the foregoing embodiment, to obtain the user behavior feature corresponding to the acquired user behavior data in the predetermined time period, thereby providing a prerequisite for subsequent information recommendation for the user.

In some embodiments, after the user behavior feature corresponding to the user behavior data is determined, the target recommendation information may be determined based on the determined user behavior feature, and the determined target recommendation information is recommended to the user.

According to the method provided in the embodiments of this application, acquired user behavior data in a predetermined time period is learned based on the optimized quantization model, a user behavior feature corresponding to the user behavior data is determined, and target recommendation information is recommended based on the user behavior feature. In this way, the recommendation system based on the optimized quantization model can quickly learn a new data feature according to specific behavior data of the user in the predetermined time period, thereby improving an online prediction capability of the quantization model and accuracy of online prediction and recommendation based on the quantization model.

Figure 9:
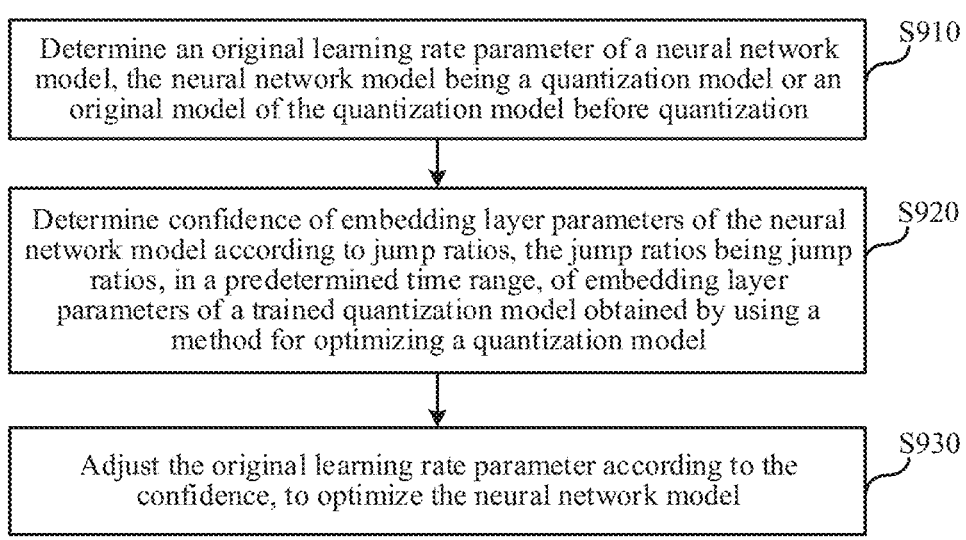
FIG. 9 is a schematic flowchart of a method for optimizing a neural network model according to an embodiment of this application.

Another embodiment of this application provides a method for optimizing a neural network model. The method is applicable to a computer device, and the computer device may be a terminal or a server. The terminal may be a desktop device or a mobile terminal. The server may be an independent physical server, a physical server duster, or a virtual server. As shown in FIG. 9, the method may include the following steps:

Step S910: Determine an original learning rate parameter of a neural network model, the neural network model being a quantization model or an original model of the quantization model before quantization.

Step S920: Determine confidence of embedding layer parameters of the neural network model according to jump ratios, the jump ratios being the jump ratios, in the predetermined time range, of the embedding layer parameters of the trained quantization model obtained by using the method for optimizing a quantization model.

Step S930: Adjust the original learning rate parameter according to the confidence, to optimize the neural network model.

In some embodiments, the neural network model in this embodiment of this application may be an original neural network model before quantization processing on the embedding layer parameters, or may be a quantization model that is a neural network model obtained after the quantization processing on the embedding layer parameters.

In some embodiments, if the original neural network model whose embedding layer parameters are not quantized is currently used, an original learning rate parameter of the neural network model needs to be determined first. Confidence of the embedding layer parameters of the neural network model is determined based on a proportional relationship between jump ratios and predetermined confidence. The original learning rate parameter is adjusted according to the confidence, to optimize the neural network model. The jump ratios are the jump ratios, in the predetermined time range, of the embedding layer parameters of the trained quantization model obtained by using the method for optimizing a quantization model.

In some embodiments, if a quantization model (that is, the neural network model obtained after the quantization processing on the embedding layer parameters) is currently used, an original learning rate parameter of the quantization model needs to be determined first. Confidence of the embedding layer parameters of the quantization model is determined based on a proportional relationship between jump ratios and predetermined confidence. The original learning rate parameter is adjusted according to the confidence, to optimize the quantization model. The jump ratios are the jump ratios, in the predetermined time range, of the embedding layer parameters of the trained quantization model obtained by using the method for optimizing a quantization model.

In some embodiments, assume that the jump ratios of the embedding layer parameters in this embodiment of this application are inversely proportional to current embedding layer confidence. If a jump ratio of the embedding layer parameters is higher, a probability that the embedding layer parameters in a corresponding predetermined time interval are different from embedding layer parameters corresponding to a stable neural network model is higher, and the embedding layer parameters of the neural network model are more unreliable, that is, the confidence is lower. When the confidence in the predetermined time interval meets a first preset condition (for example, significantly lower than confidence of the embedding layer parameters in a previous predetermined time interval, or less than a first predetermined confidence threshold), the learning rate parameter needs to be increased, so that the learning rate parameter may be quickly adjusted. If a jump ratio of the embedding layer parameters is lower, a probability that the embedding layer parameters in a corresponding predetermined time interval are different from embedding layer parameters corresponding to a stable neural network model is lower, and the embedding layer parameters are more reliable, that is, the confidence is higher. When the confidence in the predetermined time interval meets a second preset condition (for example, significantly higher than confidence of the embedding layer parameters in a previous predetermined time interval, or not less than a second predetermined confidence threshold), the learning rate parameter needs to be appropriately decreased, so that the learning rate parameter can be fine-tuned. The jump ratios of the embedding layer parameters of the optimized quantization model may be used as a basis to adjust the learning rate parameter of the neural network model in a current predetermined time interval in contiguous space, that is, may be used as a basis to adjust the learning rate parameter, in the current predetermined time interval, of the original neural network model whose embedding layer parameters are not quantized or the neural network model obtained after the quantization processing on the embedding layer parameters.

According to the method provided in the embodiments of this application, confidence corresponding to jump ratios is determined, and a learning rate parameter of a neural network model is adjusted according to the confidence, to optimize the neural network model. In this way, the neural network model can quickly learn a new data feature, thereby improving an online prediction capability of the quantization model and accuracy of online prediction and recommendation based on the quantization model.

Figure 10:
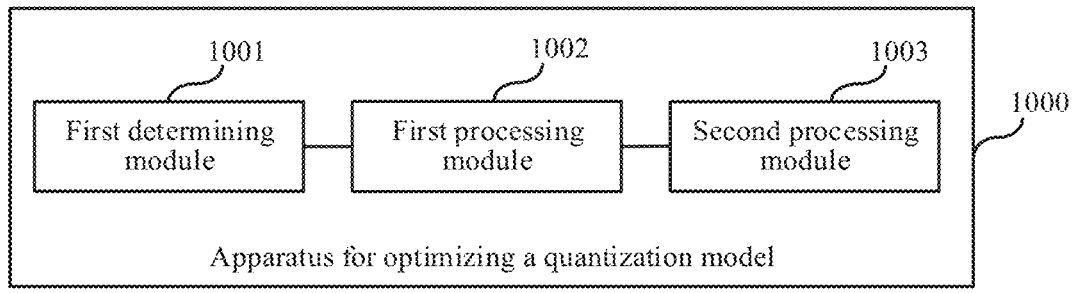
FIG. 10 is a schematic diagram of a basic structure of an apparatus for optimizing a quantization model according to an embodiment of this application.

FIG. 10 is a schematic diagram of a basic structure of an apparatus for optimizing a quantization model according to another embodiment of this application. As shown in FIG. 10, the apparatus 1000 may include a first determining module 1001, a first processing module 1002, and a second processing module 1003.

The first determining module 1001 may determine jump ratios of embedding layer parameters of a trained quantization model in a predetermined time range, the quantization model being a neural network model obtained after quantization processing on the embedding layer parameters.

The first processing module 1002 may determine a jump curve in the predetermined time range according to the jump ratios, and fit the jump curve to obtain a corresponding time scaling parameter.

The second processing module 1003 may optimize an original optimization algorithm of the quantization model based on the time scaling parameter to obtain an optimized target optimization algorithm, and train the quantization model based on the target optimization algorithm.

According to the apparatus provided in the embodiments of this application, a jump curve of jump ratios of embedding layer parameters of a trained quantization model in a predetermined time range is determined, an original optimization algorithm of the quantization model is optimized according to a time scaling parameter obtained by fitting the jump curve, and the quantization model is trained based on the optimized original optimization algorithm. In this way, a time parameter is fully considered during optimization of the original optimization algorithm, so that the quantization model can quickly learn a new data feature in an online use process, thereby improving an online prediction capability of the quantization model and accuracy of online prediction and recommendation based on the quantization model.

Figure 11:
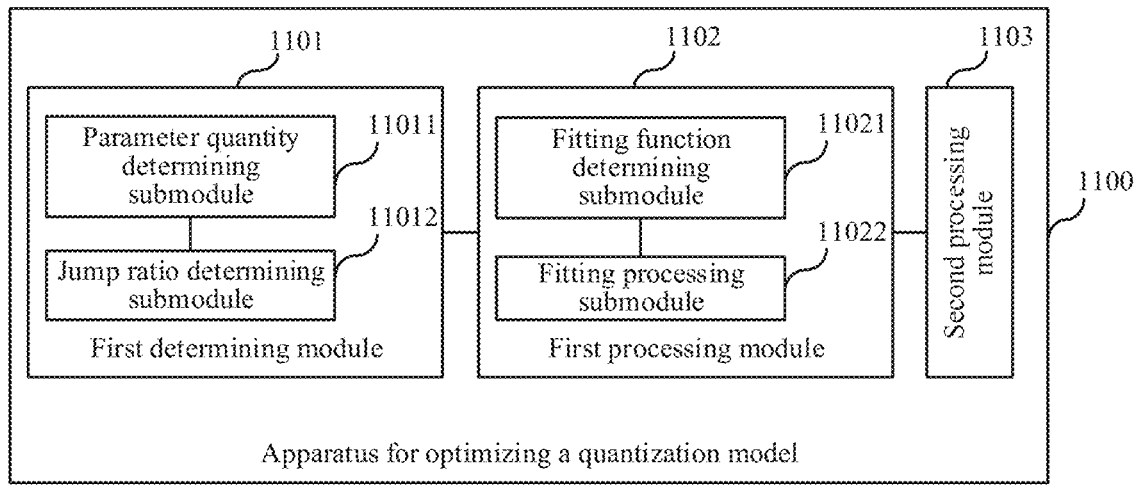
FIG. 11 is a schematic diagram of a detailed structure of an apparatus for optimizing a quantization model according to an embodiment of this application.

FIG. 11 is a schematic diagram of a detailed structure of an apparatus for optimizing a quantization model according to another embodiment of this application. As shown in FIG. 11, the apparatus 1100 may include a first determining module 1101, a first processing module 1102, and a second processing module 1103. A function implemented by the first determining module 1101 in FIG. 11 is the same as that implemented by the first determining module 1001 in FIG. 10. A function implemented by the first processing module 1102 in FIG. 11 is the same as that implemented by the first processing module 1002 in FIG. 10. A function implemented by the second processing module 1103 in FIG. 11 is the same as that implemented by the second processing module 1003 in FIG. 10. Details are not described herein.

The quantization processing on the embedding layer parameters is N-valued quantization processing on the embedding layer parameters, N being an integer greater than 1.

The first determining module 1101 may determine a jump ratio corresponding to a parameter jump of the embedding layer parameters in each predetermined time interval in the predetermined time range.

The first determining module 1101 may include a parameter quantity determining submodule 11011 and a jump ratio determining submodule 11012, as shown in FIG. 11.

The parameter quantity determining submodule 11011 may determine a quantity of parameters that jump in the embedding layer parameters in any predetermined time interval, relative to the embedding layer parameters in a previous predetermined time interval of the any predetermined time interval.

The jump ratio determining submodule 11012 may determine the jump ratio of the parameter jump of the embedding layer parameters in the any predetermined time interval according to the quantity of parameters and a total quantity of embedding layer parameters.

In another exemplary implementation, the first processing module 1102 may include a fitting function determining submodule 11021 and a fitting processing submodule 11022.

The fitting function determining submodule 11021 may determine a curve type of the jump curve, and determine a fitting function corresponding to the curve type.

The fitting processing submodule 11022 may fit the jump curve according to the fitting function to obtain a corresponding time scaling parameter.

In some embodiments, the second processing module 1103 may optimize a learning rate parameter in an original optimization algorithm according to the time scaling parameter.

In some embodiments, the second processing module 1103 may update the learning rate parameter in the original optimization algorithm to a product of the learning rate parameter and the time scaling parameter.

In some embodiments, the second processing module 1103 may increase the time scaling parameter when a convergence speed of the quantization model is less than a predetermined speed threshold; and decrease the time scaling parameter when a precision of the quantization model is less than a predetermined precision threshold.

Figure 12:
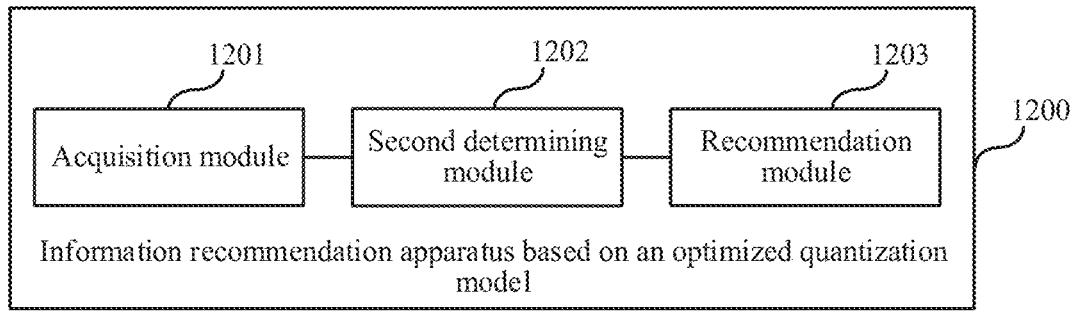
FIG. 12 is a schematic diagram of a basic structure of an information recommendation apparatus based on an optimized quantization model according to an embodiment of this application.

FIG. 12 is a schematic diagram of a basic structure of an information recommendation apparatus based on an optimized quantization model according to another embodiment of this application. As shown in FIG. 12, the apparatus 1200 may include an acquisition module 1201, a second determining module 1202, and a recommendation module 1203.

The acquisition module 1201 may acquire user behavior data in a predetermined time period.

The second determining module 1202 may learn the user behavior data based on the optimized quantization model obtained by using the method for optimizing a quantization model, and determine a user behavior feature corresponding to the user behavior data.

The recommendation module 1203 may determine target recommendation information based on the user behavior feature, and recommend the target recommendation information.

According to the apparatus provided in the embodiments of this application, acquired user behavior data in a predetermined time period is learned based on the optimized quantization model, a user behavior feature corresponding to the user behavior data is determined, and target recommendation information is recommended based on the user behavior feature. In this way, a recommendation system based on the optimized quantization model can quickly learn a new data feature according to specific behavior data of the user in the predetermined time period, thereby improving an online prediction capability of the quantization model and accuracy of online prediction and recommendation based on the quantization model.

Figure 13:
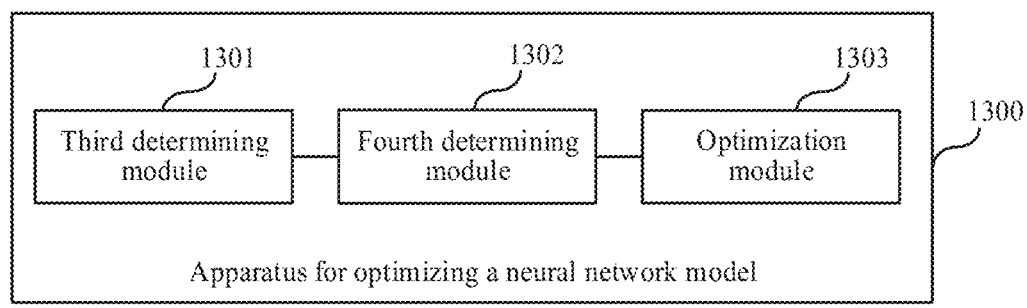
FIG. 13 is a schematic diagram of a basic structure of an apparatus for optimizing a neural network model according to an embodiment of this application.

FIG. 13 is a schematic diagram of a basic structure of an apparatus for optimizing a neural network model according to another embodiment of this application. As shown in FIG. 13, the apparatus 1300 may include a third determining module 1301, a fourth determining module 1302, and an optimization module 1303.

The third determining module 1301 may determine an original learning rate parameter of a neural network model, the neural network model being a quantization model or an original model of the quantization model before quantization.

The fourth determining module 1302 may determine confidence of embedding layer parameters of the neural network model according to jump ratios, the jump ratios being the jump ratios, in the predetermined time range, of the embedding layer parameters of the trained quantization model obtained by using the method for optimizing a quantization model.

The optimization module 1303 may adjust the original learning rate parameter according to the confidence, to optimize the neural network model.

In some embodiments, the optimization module 1303 may decrease the original learning rate parameter when the confidence meets a first preset condition; and increase the original learning rate parameter when the confidence meets a second preset condition.

According to the apparatus provided in the embodiments of this application, confidence corresponding to jump ratios is determined, and a learning rate parameter of a neural network model is adjusted according to the confidence, to optimize the neural network model. In this way, the neural network model can quickly learn a new data feature, thereby improving an online prediction capability of the quantization model and accuracy of online prediction and recommendation based on the quantization model.

Figure 14:
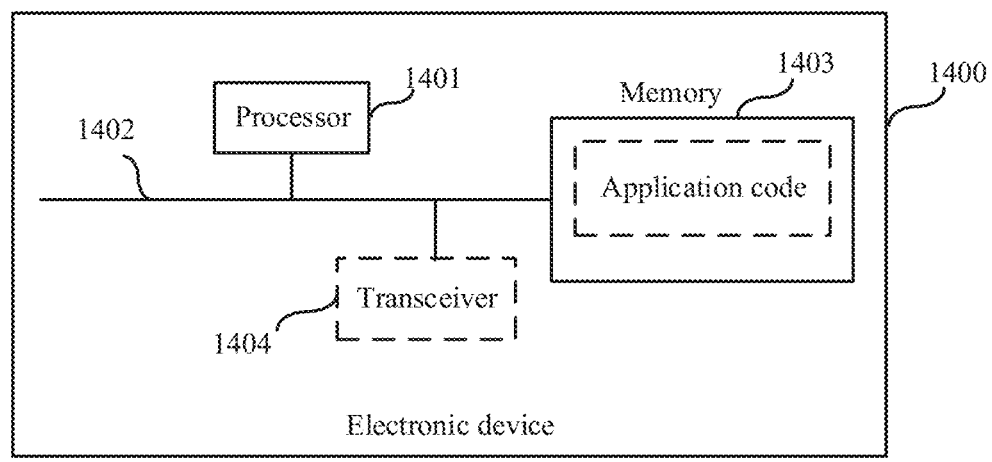
FIG. 14 is a schematic structural diagram of an electronic device according to an embodiment of this application.

As shown in FIG. 14, another embodiment of this application provides an electronic device. An electronic device 1400 shown in FIG. 14 includes a processor 1401 and a memory 1403. The processor 1401 and the memory 1403 are connected, for example, are connected by using a bus 1402. In some embodiments, the electronic device 1400 may further include a transceiver 1404. In actual application, there may be one or more transceivers 1404. The structure of the electronic device 1400 does not constitute a limitation on this embodiment of this application.

In this embodiment of this application, the processor 1401 is configured to implement functions of the first determining module, the first processing module, and the second processing module shown in FIG. 10 or FIG. 11, implement functions of the acquisition module, the second determining module, and the recommendation module shown in FIG. 12, and implement functions of the third determining module, the fourth determining module, and the optimization module shown in FIG. 13.

The processor 1401 may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or perform various examples of logic blocks, modules, and circuits described with reference to content disclosed in this application. The processor 1401 may be alternatively a combination to implement a computing function, for example, may be a combination of one or more microprocessors, or a combination of a DSP and a microprocessor.

The bus 1402 may include a channel, to transmit information between the foregoing components. The bus 1402 may be a PCI bus, an EISA bus, or the like. The bus 1402 may be classified into an address bus, a data bus, a control bus, and the like. For ease of description, the bus in FIG. 14 is represented by using only one bold line, but this does not indicate that there is only one bus or one type of bus.

The memory 1403 may be a read-only memory (ROM) or another type of static storage device that can store static information and a static instruction; or a random access memory (RAM) or another type of dynamic storage device that can store information and an instruction; or may be an EEPROM, a CD-ROM or another compact-disc storage medium, optical disc storage medium (including a compact disc, a laser disk, an optical disc, a digital versatile disc, a Blu-ray disc, or the like) and magnetic disk storage medium, another magnetic storage device, or any other medium that can be configured to carry or store expected program code in a form of an instruction or a data structure and that is accessible by a computer, but is not limited thereto.

The memory 1403 is configured to store application program code for performing the solutions of this application, and is controlled and executed by the processor 1401. The processor 1401 is configured to execute the application code stored in the memory 1403, to implement actions of the apparatus for optimizing a quantization model provided in the embodiment shown in FIG. 10 or FIG. 11, or implement actions of the information recommendation apparatus based on an optimized quantization model provided in the embodiment shown in FIG. 12, or implement actions of the apparatus for optimizing a neural network model provided in the embodiment shown in FIG. 13.

Still another embodiment of this application provides an electronic device, including a memory, a processor, and a computer program stored on the memory and executable on the processor. When executing the program, the processor can implement the methods of the embodiments.

For example, according to the apparatus provided in the embodiment of this application, a jump curve of jump ratios of embedding layer parameters of a trained quantization model in a predetermined time range is determined, an original optimization algorithm of the quantization model is optimized according to a time scaling parameter obtained by fitting the jump curve, and the quantization model is trained based on the optimized original optimization algorithm. In this way, a time parameter is fully considered during optimization of the original optimization algorithm, so that the quantization model can quickly learn a new data feature in an online use process, thereby improving an online prediction capability of the quantization model and accuracy of online prediction and recommendation based on the quantization model.

In another example, according to the apparatus provided in the embodiments of this application, acquired user behavior data in a predetermined time period is learned based on the optimized quantization model, a user behavior feature corresponding to the user behavior data is determined, and target recommendation information is recommended based on the user behavior feature. In this way, the recommendation system based on the optimized quantization model can quickly learn a new data feature according to specific behavior data of the user in the predetermined time period, thereby improving an online prediction capability of the quantization model and accuracy of online prediction and recommendation based on the quantization model.

In another example, according to the apparatus provided in the embodiments of this application, confidence corresponding to jump ratios is determined, and a learning rate parameter of a neural network model is adjusted according to the confidence, to optimize the neural network model. In this way, the neural network model can quickly learn a new data feature, thereby improving an online prediction capability of the quantization model and accuracy of online prediction and recommendation based on the quantization model.

Still another embodiment of this application provides a computer-readable storage medium, storing a computer program, the program, when executed by a processor, implementing the method according to any embodiment of this application.

For example, according to the apparatus provided in the embodiments of this application, a jump curve of jump ratios of embedding layer parameters of a trained quantization model in a predetermined time range is determined, an original optimization algorithm of the quantization model is optimized according to a time scaling parameter obtained by fitting the jump curve, and the quantization model is trained based on the optimized original optimization algorithm. In this way, a time parameter is fully considered during optimization of the original optimization algorithm, so that the quantization model can quickly learn a new data feature in an online use process, thereby improving an online prediction capability of the quantization model and accuracy of online prediction and recommendation based on the quantization model.

In another example, acquired user behavior data in a predetermined time period is learned based on the optimized quantization model, a user behavior feature corresponding to the user behavior data is determined, and target recommendation information is recommended based on the user behavior feature. In this way, a recommendation system based on the optimized quantization model can quickly learn a new data feature according to specific behavior data of the user in the predetermined time period, thereby improving an online prediction capability of the quantization model and accuracy of online prediction and recommendation based on the quantization model.

In another example, confidence corresponding to jump ratios is determined, and a learning rate parameter of a neural network model is adjusted according to the confidence, to optimize the neural network model. In this way, the neural network model can quickly learn a new data feature, thereby improving an online prediction capability of the quantization model and accuracy of online prediction and recommendation based on the quantization model.

It is to be understood that, although the steps in the flowchart in the accompanying drawings are sequentially shown according to indication of an arrow, the steps are not necessarily sequentially performed according to a sequence indicated by the arrow. Unless explicitly specified in this specification, execution of the steps is not strictly limited in the sequence, and the steps may be performed in other sequences. In addition, at least some steps in the flowcharts in the accompanying drawings may include a plurality of substeps or a plurality of stages. The substeps or the stages are not necessarily performed at the same moment, but may be performed at different moments. The substeps or the stages are not necessarily performed in sequence, but may be performed in turn or alternately with another step or at least some of substeps or stages of the another step.

The foregoing descriptions are some implementations of this application. A person of ordinary skill in the art may make several improvements and refinements without departing from the principle of this application, and the improvements and refinements shall fall within the protection scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as example for description when the systems, devices, and apparatus provided in the foregoing embodiments performs optimization and/or training. In practical application, the foregoing functions may be allocated to and completed by different functional modules according to requirements, that is, an inner structure of a device is divided into different functional modules to implement all or a part of the functions described above.

What is claimed is:

1. An optimization method applicable to an electronic device, the method comprising:
  determining jump ratios of embedding layer parameters of a trained quantization model in a first predetermined time range, each jump ratio corresponding to a parameter jump of the embedding layer parameters of the trained quantization model in each predetermined time interval within the first predetermined time range, the quantization model being a neural network model obtained after quantization processing on the embedding layer parameters;

determining a jump curve in the first predetermined time range according to the jump ratios;

fitting the jump curve to obtain a corresponding time scaling parameter;

optimizing an initial algorithm of the quantization model based on the time scaling parameter to obtain an optimized target optimization algorithm;

training the quantization model based on the target optimization algorithm to obtain an optimized quantization model, wherein the time scaling parameter is configured to adjust a convergence speed and a precision of the quantization model;

acquiring user behavior data associated with a user at a terminal in a second predetermined time range;

learning the user behavior data using the optimized quantization model;

determining a user behavior feature corresponding to the user behavior data;

determining target recommendation information based on the user behavior feature; and;

providing the target recommendation information to the user at the terminal.

2. The method according to claim 1, wherein the quantization processing comprises N-valued quantization processing on the embedding layer parameters, wherein N is an integer greater than one.

3. The method according to claim 1, wherein:
a respective jump ratio of a parameter jump of the embedding layer parameters in any predetermined time interval is determined by:
determining a quantity of parameters that jump in the embedding layer parameters in the any predetermined time interval, relative to the embedding layer parameters in a previous predetermined time interval of the any predetermined time interval; and
determining the jump ratio of the parameter jump of the embedding layer parameters in the any predetermined time interval according to the quantity of parameters and a total quantity of embedding layer parameters.

4. The method according to claim 1, wherein fitting the jump curve further comprises:
determining a curve type of the jump curve, and determining a fitting function corresponding to the curve type; and
fitting the jump curve according to the fitting function to obtain the corresponding time scaling parameter.

5. The method according to claim 1, wherein optimizing the initial algorithm of the quantization model further comprises:
optimizing a learning rate parameter in the initial algorithm according to the time scaling parameter.

6. The method according to claim 5, wherein optimizing the learning rate parameter in the initial algorithm further comprises:
updating the learning rate parameter in the initial algorithm to a product of the learning rate parameter and the time scaling parameter.

7. The method according to claim 1, wherein training the quantization model further comprises:
increasing the time scaling parameter when the convergence speed of the quantization model is less than a predetermined speed threshold; and decreasing the time scaling parameter when the precision of the quantization model is less than a predetermined precision threshold.

8. An electronic device, comprising:
one or more processors; and
memory storing one or more programs that, when executed by the one or more processors, cause the one or more processors to perform operations comprising:
determining jump ratios of embedding layer parameters of a trained quantization model in a first predetermined time range, each jump ratio corresponding to a parameter jump of the embedding layer parameters of the trained quantization model in each predetermined time interval within the first predetermined time range, the quantization model being a neural network model obtained after quantization processing on the embedding layer parameters;
determining a jump curve in the first predetermined time range according to the jump ratios;
fitting the jump curve to obtain a corresponding time scaling parameter;
optimizing an initial algorithm of the quantization model based on the time scaling parameter to obtain an optimized target optimization algorithm;
training the quantization model based on the target optimization algorithm to obtain an optimized quantization model, wherein the time scaling parameter is configured to adjust a convergence speed and a precision of the quantization model;
acquiring user behavior data associated with a user at a terminal in a second predetermined time range;
learning the user behavior data using the optimized quantization model;
determining a user behavior feature corresponding to the user behavior data;
determining target recommendation information based on the user behavior feature; and;
providing the target recommendation information to the user at the terminal.

9. The electronic device according to claim 8, wherein the quantization processing comprises N-valued quantization processing on the embedding layer parameters, wherein N is an integer greater than one.

10. The electronic device according to claim 8, wherein:
a respective jump ratio of a parameter jump of the embedding layer parameters in any predetermined time interval is determined by:
determining a quantity of parameters that jump in the embedding layer parameters in the any predetermined time interval, relative to the embedding layer parameters in a previous predetermined time interval of the any predetermined time interval; and
determining the jump ratio of the parameter jump of the embedding layer parameters in the any predetermined time interval according to the quantity of parameters and a total quantity of embedding layer parameters.

11. The electronic device according to claim 8, wherein fitting the jump curve further comprises:
determining a curve type of the jump curve, and determining a fitting function corresponding to the curve type; and
fitting the jump curve according to the fitting function to obtain the corresponding time scaling parameter.

12. The electronic device according to claim 8, wherein optimizing the initial algorithm of the quantization model further comprises:

optimizing a learning rate parameter in the initial algorithm according to the time scaling parameter.

13. The electronic device according to claim 12, wherein optimizing the learning rate parameter in the initial algorithm further comprises:
updating the learning rate parameter in the initial algorithm to a product of the learning rate parameter and the time scaling parameter.

14. The electronic device according to claim 8, wherein training the quantization model further comprises:
increasing the time scaling parameter when the convergence speed of the quantization model is less than a predetermined speed threshold; and
decreasing the time scaling parameter when the precision of the quantization model is less than a predetermined precision threshold.

15. A non-transitory computer readable storage medium storing instructions that, when executed by one or more processors of an electronic device, cause the one or more processors to perform operations comprising:
determining jump ratios of embedding layer parameters of a trained quantization model in a first predetermined time range, each jump ratio corresponding to a parameter jump of the embedding layer parameters of the trained quantization model in each predetermined time interval within the first predetermined time range, the quantization model being a neural network model obtained after quantization processing on the embedding layer parameters;
determining a jump curve in the first predetermined time range according to the jump ratios;
fitting the jump curve to obtain a corresponding time scaling parameter;
optimizing an initial algorithm of the quantization model based on the time scaling parameter to obtain an optimized target optimization algorithm;
training the quantization model based on the target optimization algorithm to obtain an optimized quantization model, wherein the time scaling parameter is configured to adjust a convergence speed and a precision of the quantization model;
acquiring user behavior data associated with a user at a terminal in a second predetermined time range;
learning the user behavior data using the optimized quantization model:
determining a user behavior feature corresponding to the user behavior data;
determining target recommendation information based on the user behavior feature; and;
providing the target recommendation information to the user at the terminal.

16. The non-transitory computer readable storage medium according to claim 15, wherein the quantization processing comprises N-valued quantization processing on the embedding layer parameters, wherein N is an integer greater than one.

17. The non-transitory computer readable storage medium according to claim 15, wherein:
a respective jump ratio of a parameter jump of the embedding layer parameters in any predetermined time interval is determined by:
determining a quantity of parameters that jump in the embedding layer parameters in the any predetermined time interval, relative to the embedding layer parameters in a previous predetermined time interval of the any predetermined time interval; and
determining the jump ratio of the parameter jump of the embedding layer parameters in the any predetermined time interval according to the quantity of parameters and a total quantity of embedding layer parameters.

18. The non-transitory computer readable storage medium according to claim 15, wherein fitting the jump curve further comprises:
determining a curve type of the jump curve, and determining a fitting function corresponding to the curve type; and
fitting the jump curve according to the fitting function to obtain the corresponding time scaling parameter.

19. The non-transitory computer readable storage medium according to claim 15, wherein optimizing the initial algorithm of the quantization model further comprises:
optimizing a learning rate parameter in the initial algorithm according to the time scaling parameter.

\* \* \* \* \*